(12) United States Patent
Kildishev et al.

(10) Patent No.: US 8,094,378 B2
(45) Date of Patent: Jan. 10, 2012

(54) PLANAR LENS

(75) Inventors: Alexander V. Kildishev, West Lafayette, IN (US); Vladimir M. Shalaev, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 12/605,021

(22) Filed: Oct. 23, 2009

(65) Prior Publication Data

US 2010/0165473 A1    Jul. 1, 2010

Related U.S. Application Data

(60) Provisional application No. 61/107,742, filed on Oct. 23, 2008.

(51) Int. Cl.
*G02B 3/00* (2006.01)
*G02B 5/00* (2006.01)
*G02F 1/00* (2006.01)

(52) U.S. Cl. ......... 359/642; 359/321; 250/505.1; 977/701; 977/707; 977/963; 428/910; 428/913

(58) Field of Classification Search .......... 359/642, 359/321; 250/505.1; 977/701, 707, 963; 428/910, 913
See application file for complete search history.

(56) References Cited

U.S. PATENT DOCUMENTS

| | | | |
|---|---|---|---|
| 6,756,932 B1 | 6/2004 | Barker et al. | |
| 6,788,273 B1 | 9/2004 | Schultz et al. | |
| 6,859,114 B2 | 2/2005 | Eleftheriades et al. | |
| 6,933,812 B2 | 8/2005 | Sarabandi et al. | |
| 6,938,325 B2 | 9/2005 | Tanielian | |
| 7,106,918 B2 | 9/2006 | Bita et al. | |
| 7,184,623 B2 | 2/2007 | Cai et al. | |
| 7,349,613 B2 | 3/2008 | Wang | |
| 7,421,178 B2 | 9/2008 | Podolskiy et al. | |
| 7,482,727 B2 | 1/2009 | Bratkovski et al. | |
| 7,538,946 B2 * | 5/2009 | Smith et al. ............ | 359/569 |
| 2005/0221128 A1 | 10/2005 | Kochergin | |
| 2007/0114431 A1 | 5/2007 | Wang et al. | |
| 2007/0171536 A1 * | 7/2007 | Tsukagoshi ............ | 359/642 |
| 2007/0188385 A1 | 8/2007 | Hyde et al. | |
| 2007/0273055 A1 | 11/2007 | Sazio et al. | |
| 2008/0024792 A1 | 1/2008 | Pendry et al. | |
| 2008/0138571 A1 | 6/2008 | Sazio et al. | |
| 2008/0165442 A1 | 7/2008 | Cai et al. | |
| 2009/0040132 A1 | 2/2009 | Sridhar et al. | |
| 2009/0273538 A1 | 11/2009 | Smith et al. | |

(Continued)

OTHER PUBLICATIONS

Office Action from U.S. Appl. No. 11/983,228, dated Jul. 7, 2010, 21 pages.

(Continued)

*Primary Examiner* — Evelyn A. Lester
(74) *Attorney, Agent, or Firm* — Brinks Hofer Gilson & Lione

(57) ABSTRACT

A design method, apparatus, and fabrication method for structures for controlling the flow of electromagnetic energy at a sub-wavelength scale is disclosed. Transformational optics principles are used as a starting point for the design of structures that operate as, for example, hyperlenses or concentrators such that evanescent waves at a first surface are radiated in the far field at a second surface. Plane waves incident at a first surface may be focused to a spot size substantially smaller than a wavelength, so as to interact with objects at the focal point, or be re-radiated.

28 Claims, 6 Drawing Sheets

U.S. PATENT DOCUMENTS

| | | | |
|---|---|---|---|
| 2010/0110559 A1* | 5/2010 | Cai et al. | 359/642 |
| 2010/0118412 A1* | 5/2010 | Sanada | 359/642 |
| 2010/0134898 A1* | 6/2010 | Shalaev et al. | 359/665 |
| 2010/0265591 A1* | 10/2010 | Bowers et al. | 359/642 |
| 2010/0265592 A1* | 10/2010 | Bowers et al. | 359/642 |
| 2010/0277808 A1* | 11/2010 | Bowers et al. | 359/642 |

OTHER PUBLICATIONS

Response to Office Action for U.S. Appl. No. 11/983,228,dated Dec. 20, 2010, 23 pages.
Alu, A. et al., "Achieving transparency with plasmonic and metamaterial coatings," Physical Review E 72, © 2005 The American Physical Society, pp. 016623-1 to 016623-9.
Aspnes, D. E., "Optical Properties of Thin Films," Thin Solid Films, 89 (1982), Electronics and Optics, presented at the Fifth International Thin Films Congress, Herzha-on-Sea, Israel, Sep. 21-25, 1981, © Elsevier Sequoia, pp. 249-262.
Cai, Wenshan et al., "Nonmagnetic cloak with minimized scattering," Applied Physics Letters 91, © 2007 American Institute of Physics, pp. 111105-1 to 111105-3.
Chettiar, U.K. et al., "From Low-loss to Lossless Optical Negative-Index Materials," © 2006 Optical Society of America, 2 pages.
Cummer, S. et al., "Full-wave simulations of electromagnetic cloaking structures," Physical Review E 74, © 2006 The American Physical Society, pp. 036621-1 to 036621-5.
Garcia de Abajo, F.J. et al., "Tunneling Mechanism of Light Transmission through Metallic Films," Physical Review Letters, week ending Aug. 5, 2005, © 2005 The American Physical Society, pp. 067403-1 to 067403-4.
Johnson, P.B. et al., "Optical Constants of the Noble Metals," Physical Review B, vol. 6, No. 12, Dec. 15, 1972, pp. 4370-4379.
Kildishev, A. et al., "Negative refractive index in optics of metal-dielectric composites," vol. 23, No. 3/Mar. 2006/J. Opt. Soc. Am. B., © 2006 Optical Society of America, pp. 423-433.
Klein, M.W. et al., "Single-slit split ring resonators at optical frequencies: limits of size scaling," May 1, 2006/vol. 31, No. 9/ Optics Letters, © 2006 Optical Society of America, pp. 1259-1261.
Leonhardt, U., "Optical Conforming Mapping," www.sciencemag.org, Science, vol. 312, Jun. 23, 2006, pp. 1777-1780.
Milton, G.W. et al., "On the cloaking effects associated with anomalous localized resonance," Proc. R. Soc. A., © 2006 The Royal Society, pp. 1-33.
Pendry, J.B. et al., "Controlling Electromagnetic Fields," www.sciencemag.org, Science, vol. 312, Jun. 23, 2006, pp. 1780-1782.
Podolskiy, V.A. et al., "Plasmon Modes in Metal Nanowires and Left-Handed Materials," Journal of Nonlinear Optical Physics & Materials, vol. 11, No. 1, (2002), © World Scientific Publishing Company, pp. 65-74.
Schurig, D. et al., "Metamaterial Electromagnetic Cloak at Microwave Frequencies," Sciencexpress/ www.sciencexpress.org /Oct. 19, 2006, 8 pages.
Schwartz, B. et al., "Total external reflection from metamaterials with ultralow refractive index," J. Opt. Soc. Am. B/vol. 20, No. 12/ Dec. 2003, © 2003 Optical Society of America, pp. 2448-2453.
Zhou, J. et al., "Saturation of the Magnetic Response of Split-Ring Resonators at Optical Frequencies," Physical Review Letters, week ending Nov. 25, 2005, © 2005 The American Physical Society, pp. 223902-1 to 223902-4.
DailyIndia.com, "Scientists use gold rings to create world's first true invisibility cloak," obtained at Internet address: http://www.dailyindia.com/show/179148.php/Scientists-use-goldring, 2 pages.
Dolin, L. S., "To the Possibility of Comparison of Three-Dimensional Electromagnetic Systems With Nonuniform Anisotropic Filling," Scientific Research Radiophysical Institute of the Gorky State University, submitted to Editorial Board on Mar. 11, 1961., Izv. VUZov, Radiofizika, 1961, vol. 4, No. 5, pp. 964-967 (3 pages—English translation; 4 pages—Russian language).
Boltasseva, A., et al., "Fabrication of optical negative-index metamaterials: Recent advances and outlook," Elsevier, Metamaterial 2, (available online Mar. 18, 2008), 17 pages.
Caloz, C., et al., "Full-wave verification of the fundamental properties of left-handed materials in waveguide configurations," Journal of Applied Physics, vol. 90, No. 11, Dec. 1, 2001, © 2001 American Institute of Physics, pp. 5483-5486.
Huang, Y., et al., "Electromagnetic cloaking by layered structure of homogeneous isotropric materials," Sep. 3, 2007/ vol. 15, No. 18, Optics Express, © 2007 OSA, pp. 11133-11141.
Jacob, Z., et al., "Semiclassical theory of the Hyperlens," © 2006 Optical Society of America, 2 pages.
Momeni, B., et al., Adiabatic matching stage for coupling of light to extended Bloch modes of photonic crystals, Applied Physics Letters 87, © 2005 American Institute of Physics, pp. 171104-1/3.
Chettiar, U.K., et al., "Double Negative Index Metamaterial: Simultaneous Negative Permeability and Permittivity at 812 nm", © 2007 Optical Society of America, 3 pages.
Kanté, B., et al., "Infrared cloaking based on the electric response of split ring resonators," (C) 2008 OSA, Jun. 9, 2008/vol. 16, No. 12/ Optics Express, pp. 9192-9198.
Kanté, B., et al., "Experimental demonstration of a nonmagnetic metamaterial cloak at microwave frequencies," © 2009 The American Physical Society, pp. 201104-1/201104-4.
Kopperschmidt, P., "Model of a two-dimensional photonic bicrystal," © 2000 The American Physical Society, Physical Review B, vol. 63, pp. 045101-1/045101-6.
Pendry JB, "Metamaterials and the Control of Electromagnetic Fields," © 2007 Optical Society of America, pp. 1-11.
Schurig, D., et al., "Calculation of material properties and ray tracing in transformation media," (C) 2006 OSA, Oct. 16, 2006 /vol. 14, No. 21/ Optics Express, pp. 9794-9804.
Shalaev, V.M., "Optical negative-index metamaterials," © 2007 Nature Publishing Group, nature photonics/ vol. 1/ Jan. 2007/ www.nature.com/naturephotonics, pp. 41-48.
Smolyaninov, I.I., et al., "Two-dimensional metamaterial structure exhibiting reduced visibility at 500 n.m.," © 2008 Optical Society of America, Optics Letters/vol. 33, No. 12/ Jun. 15, 2008, pp. 1342-1344.
Valagiannopoulos, C.A., "On Measuring the Permittivity Tensor of an Anisotropic Material from the Transmission Coefficients," Progress in Electromagnetics Research B, vol. 9, 2008, pp. 105-116.
Wang, D., et al., "Reconfigurable cloak for multiple operating frequencies," © 2008 American Institute of Physics, Applied Physics Letters 93, (2008), pp. 043515-1/3.
Aug. 21, 2008 Non-Final Office Action, U.S. Appl. No. 11/983,228 27 pages.
Sci/Tech News Staff, "Scientists Understood How to Create an Invisibility Cloak," May 26, 2006, Softpedia.
Cook, "Scientists shed new light on invisibility," May 29, 2006, Boston Globe.
Smolyaninov et al., "Magnifying superlens in the Visible Frequency Range," Mar. 23, 2007, Science vol. 315, pp. 1699-1701.
Cho, "Voila!," Oct. 20, 2006, Science, vol. 314, p. 403.
Smith et al., "Metamaterials and Negative Refractive Index," Aug. 6, 2004, Science, vol. 305, pp. 788-792.
Duke University, "First Demonstration of a Working Invisibility Cloak," http://www.dukenews.duke.edu/2006/10/cloakdemo._print.ht.
Pendry and Smith, "Reversing Light with Negative Refraction," Jun. 2004, Physics Today, pp. 37-43.
Chen et al., "Electromagnetic Wave Interactions with a Metamaterial Cloak," Aug. 10, 2007, Phys. Rev. Lett.
Gibson, "Metamaterials found to work for visible light," Jan. 4, 2007, Ames Lab public release, EurekAlert!, http://www.eurekalert.org/pub_releases/2007-01/dl-mft010407.php?light.
Huang, "research of Electromagnetic and Acoustic Cloaking," Jun. 19, 2008, masters' thesis, Dept. of Optics and Photonics.
Fox, "Invisibility cloak one step closer, scientists say," Aug. 10, 2008, cited in Aug. 21, 2008 Non-Final Office Action U.S. Appl. No. 11/983,228.
Rincon, "Experts test cloaking technology," Oct. 19, 2006, BBC News, cited in Aug. 21, 2008 Non-Final Office Action U.S. Appl. No. 11/983,228.
Pendry et al., "Magnetism from Conductors and Enhanced Nonlinear Phenomena," Nov. 11, 1999, vol. 47, No. 11, pp. 2075-2084.

Response to Aug. 21, 2008 Non-Final Office Action, U.S. Appl. No. 11/983,228, filed in the PTO on Dec. 17, 2008 (20 pages).
Jun. 17, 2009 Final Office Action, U.S. Appl. No. 11/983,228 26 pages.
Canadian Military Heritage, Jun. 20, 2004, website accessed on Jun. 13, 2009 at http://www.cmhg-phmc.gc.ca/cmh/en/image_484.asp (1 page).
Purdue News, "Engineers see progress in creating 'invisibility cloak," Apr. 2, 2007, accessed Jun. 4, 2009 at http://www.purdue.edu/uns/x/2007a/070402ShalaevCloaking.html (5 pages).
Response to Jun. 17, 2009 Final Office Action, U.S. Appl. No. 11/983,228, filed in the PTO on Sep. 10, 2009 (20 pages).
Oct. 21, 2009 Non-Final Office Action, U.S. Appl. No. 11/983,228 20 pages.
Response to Oct. 21, 2009 Non-Final Office Action, U.S. Appl. No. 11/983,228, filed in the PTO on Apr. 6, 2010, (21 pages).
Jul. 7, 2010 Final Office Action, U.S. Appl. No. 11/983,228 21 pages.
N. A. P. Nicorovici, G.W. Milton, R. C. McPhedran, and L. C. Botten, "Quasistatic cloaking of two-dimensional polarizable discrete systems by anomalous resonance," Opt. Express 15, 6314-6323 (2007).
M. G. Silveirinha, A. Alu, and N. Engheta, "Parallel-plate metamaterials for cloaking structures," Phys. Rev. B 75, 033603 (2007).
D. A. B. Miller, "On perfect cloaking," Opt. Express 14, 12457-12466 (2006).
A. Greenleaf, M. Lassas, and G. Uhlmann, "Anisotropic conductivities that cannot be detected by EIT," Physiol. Meas. 24, 413-419 (2003).
Y. Benveniste, and T. Miloh, "Neutral inhomogeneities in conduction phenomena," J. Mech. Phys. Solids 47, 1873-1892 (1999).
A. Hendi, J. Henn, and U. Leonhardt, "Ambiguities in the scattering tomography for central potentials," Phys. Rev. Lett. 97, 073902 (2006).
W. Cai, U. K. Chettiar, A. V. Kildishev, and V. M. Shalaev, "Optical cloaking with metamaterials," Nat. Photonics 1, 224-227 (2007).
R. Weder, "A rigorous analysis of high-order electromagnetic invisibility cloaks," J. Phys. A: Math. Theor. 41, 065207 (2008).
S. A. Ramakrishna, J. B. Pendry, M. C. K. Wiltshire, and W. J. Stewart, "Imaging the near field," J. Mod. Opt. 50, 1419-1430 (2003).
D. Schurig, and D. R. Smith, "Sub-diffraction imaging with compensating bilayers," New J. Phys. 7, 162 (2005).
S. M. Feng, and J. M. Elson, "Diffraction-suppressed high-resolution imaging through metallodielectric nanofilms," Opt. Express 14, 216-221 (2006).
Z. Jacob, L. V. Alekseyev, and E. Narimanov, "Optical hyperlens: Far-field imaging beyond the diffraction limit," Opt. Express 14, 8427-8256 (2006).
A. Salandrino, and N. Engheta, "Far-field subdiffraction optical microscopy using metamateral crystals: Theory and simulations," Phys. Rev. B 74, 075103 (2006).
D. E. Aspnes, "Bounds on Allowed Values of the Effective Dielectric Function of 2-Component Composites at Finite Frequencies," Phys. Rev. B 25, 1358-1361 (1982).
D. J. Bergman, "Exactly Solvable Microscopic Geometries and Rigorous Bounds for the Complex Dielectric-Constant of a 2-Component Composite-Material," Phys. Rev. Lett. 44, 1285-1287 (1980).
G. W. Milton, "Bounds on the Complex Dielectric-Constant of a Composite-Material," Appl. Phys. Lett. 37, 300-302 (1980).
W. G. Spitzer, D. Kleinman, and D. Walsh, "Infrared Properties of Hexagonal Silicon Carbide," Phys. Rev. 113, 127-132 (1959).
D. Korobkin, Y. Urzhumov, and G. Shvets, "Enhanced near-field resolution in midinfrared using metamaterials," J. Opt. Sec. Am. B 23, 468-478 (2006).
T. Taubner, D. Korobkin, Y. Urzhumov, G. Shvets, and R. Hillenbrand, "Near-field microscopy through a SiC superlens," Science 313, 1595-1595 (2006).
J. A. Schuller, R. Zia, T. Taubner, and M. L. Brongersma, "Dielectric metamaterials based on electric and magnetic resonances of silicon carbide particles," Phys. Rev. Lett. 99, 107401 (2007).
S. O'Brien, and J. B. Pendry, "Photonic band-gap effects and magnetic activity in dielectric composites," J. Phys. Condens. Matter. 14, 4035-4044 (2002).

K. C. Huang, M. L. Povinelli, and J. D. Joannopoulos, "Negative effective permeability in polaritonic photonic crystals," Appl. Phys. Lett. 85, 543-545 (2004).
M. S. Wheeler, J. S. Aitchison, and M. Mojahedi, "Three-dimensional array of dielectric spheres with an isotropic negative permeability at infrared frequencies," Phys. Rev. B. 72, 193103 (2005).
L. Peng, L. X. Ran, H.S. Chen, H. F. Zhang, J. A. Kong, and T. M. Grzegorczyk, "Experimental observation of left-handed behavior in an array of standard dielectric resonators," Phys. Rev. Lett. 98, 157403 (2007).
Leonhardt U 2006 Notes on conformal invisibility devices New Journal of Physics 8 118.
Milton G W and Nicorovici N A P 2006 on the cloaking effects associated with anomalous localized resonance Proceedings of the Royal Society a-Mathematical Physical and Engineering Sciences 462 3027-59.
Alu A and Engheta N 2007 Cloaking and transparency for collections of particles with metamaterial and plasmonic covers Optic Express 15 7578-90.
Bruno O P and Lintner S 2007 Superlens-cloaking of small dielectric bodies in the quasistatic regime Journal of Applied Physics 102 124502.
Cai L W and Sanchez-Dehesa J 2007 Analysis of Cummer-Schurig acoustic cloaking New Journal of Physics 9 450.
Chen H S, Wu B I, Zhang B and Kong J A 2007 Electromagnetic wave interactions with a metamaterial cloak Physical Review Letters 99 063903.
Chen H Y and Chan C T 2007 Acoustic cloaking in three dimensions using acoustic metamaterials Applied Physics Letters 91 183518.
Greenleaf A, Kurylev Y, Lassas M and Uhlmann G 2007 Improvement of cylindrical cloaking with the SHS lining Optics Express 15 12717-34.
Guenneau S, Ramakrishna S A, Enoch S, Chakrabarti S, Tayeb G and Gralak B 2007 Cloaking and imaging effects in plasmonic checkerboards of negative epsilon and mu and dielectric photonic crystal checkerboards Photonics and Nanostructure-Fundamentals and Applications 5 63-72.
Teixeira F L 2007 Differential form approach to the analysis of electromagnetic cloaking and masking Microwave and Optical Technology Letters 49 2051-3.
Alitalo P, Luukkonen O. Jylha L, Venermo J and Tretyakov S A 2008 Transmission-line networks cloaking objects from electromagnetic fields Ieee Transactions on Antennsas and Propagation 56 416-24.
Blanchard C, Porti J, Wu B I, Morente J A, Salinas A and Kong J A 2008 Time domain simulation of electromagnetic cloaking structures with TLM method Optics Express 16 6461-70.
Cai W S, Chettiar U K, Kildishev A V and Shalaev V M 2008 Designs for optical cloaking with high-order transformations Optics Express 16 5444-52.
Gaillot D P, Croenne C and Lippens D 2008 An all-dielectric route for terahertz cloaking Optics Express 16 3986-92.
Jacob Z and Narimanov E E 2008 Semiclassical description of non magnetic cloaking Optics Express 16 4597-604.
Kohn R V, Shen H, Vogelius M S and Weinstein M I 2008 Cloaking via change of variables in electric impedance tomography Inverse Problems 24 015016.
Kwon D H and Werner D H 2008 Restoration of antenna parameters in scattering environments using electromagnetic cloaking Applied Physics Letters 92 113507.
Liang Z X, Yao P J, Sun X W and Jiang X & 2008 The physical picture and the essential elements of the dynamical process for dispersive cloaking structures Applied Physics Letters 92 131118.
Vanbesien O, Fabre N, Melique X and Lippens D 2008 Photonic-crystal-based cloaking device at optical wavelengths Applied Optics 47 1358-62.
Xiao D and Johnson H T 2008 Approximate optical cloaking in an axisymmetric silicon photonic crystal structure Optics Letters 33 860-2.
Zhao Y, Argyropoulos C and Hao Y 2008 Full-wave finite-difference time-domain simulation of electromagnetic cloaking structures Optics Express 16 6717-30.
Zharova N A, Shadrivov I V and Kivshar Y S 2008 Inside-out electromagnetic cloaking Optics Express 16 4615-20.

Milton G W, Briane M and Willis J R 2006 On cloaking for elasticity and physical equations with a transformation invariant form *New Journal of Physics* 8 248.

Zhang S, Genov D A, Sun C and Zhang X 2008 Cloaking of matter waves *Physical Review Letters* 100 123002.

Cheng Y, Yang F, Zu J Y and Liu X J 2008 A multilayer structured acoustic cloak with homogeneous isotropic materials *Applied Physics Letters* 92 151913.

Cummer S A, Popa B I, Schurig D, Smith D R, Pendry J, Rahm M and Starr A 2008 Scattering theory derivation of a 3D acoustic cloaking shell *Physical Review Letters* 1 024301.

Cummer S A and Schurig D 2007 One path to acoustic cloaking *New Journal of Physics* 9 45.

Kwon D H and Werner D H 2008 Two-dimensional eccentric elliptic electromagnetic cloaks *Applied Physics Letters* 92.

Jenkins A 2008 Optical cloaking—A many-layered solution *Nature Photonics* 2 270.

Jiang W X, Cui T J, Yu G X, Lin X Q, Cheng Q and Chin J Y 2008 Arbitrarily elliptical-cylindrical invisible cloaking *Journal of Physics D-Applied Physics* 41 085504.

Kwon D H and Werner D H 2008 Two-dimensional electromagnetic cloak having a uniform thickness for elliptic cylindrical regions *Applied Physics Letters* 92 113502.

Rahm M, Cummer S A, Schurig D, Pendry J B and Smith D R 2008 Optical design of reflectionless complex media by finite embedded coordinate transformations *Physical Review Letters* 1 063903.

Rahm M, Schurig D, Roberts D A, Cummer S A, Smith D R and Pendry J B 2008 Design of electromagnetic cloaks and concentrators using form-variant coordinate transformations of Maxwell's equations *Photonics and Nanostructures-Fundamentals and Applications* 6 87-95.

Sipos M and Thompson B G 2008 Electrodynamics on a grid: The finite-difference time-domain method applied to optics and cloaking *American Journal of Physics* 76 464-9.

Wood J 2008 Mew metamaterial may lead to a magnetic cloak *Materials Today* 11 8.

Yao P J, Liang Z X and Jiang X Y 2008 Limitation of the electromagnetic cloak with dispersive material *Applied Physics Letters* 92 031111.

You Y, Kattawar G W, Zhai P W and Yang P 2008 Zero-backscatter cloak for aspherical particles using a generalized DDA formalism *Optics Express* 16 2068-79.

Zhang B L, Chen H S, Wu B I and Kong J A 2008 Extraordinary surface voltage effect in the invisibility cloak with an active device inside *Physical Review Letters* 1 063904.

Zhang J J, Huangfu J T, Luo Y, Chen H S, Kong H A and Wu B I 2008 Cloak for multilayered and gradually changing media *Physical Review B* 77 035116.

Zhang P, Jin Y and He S L 2008 Cloaking an object on a dielectric half-space *Optics Express* 16 3161-6.

Kerker M 1975 Invisible Bodies *Journal of the Optical Society of America* 65 376-9.

Alu A and Engheta N 2007 Plasmonic materials in transparency and cloaking problems: mechanism, robustness, and physical insights *Optics Express* 15 3318-32.

Alu A and Engheta N 2008 Robustness in design and background variations in metamaterial/plasmonic cloaking *Radio Sciences* 43 RS4S01.

Alu A and Engheta N 2008 Multifrequency optical invisibility cloak with layered plasmonic shells *Physical Review Letters* 100 113901.

Kwon D H, Wang X, Bayraktar Z, Weiner B and Werner D H 2008 Near-infrared metamaterial films with reconfigurable transmissive/reflective properties *Optics Letters* 33 545-7.

Lax M and Nelson D F 1976 Maxwell equations in material form *Physical Review B* 13 1777.

Chew W C and Weedon W H 1994 A 3d Perfectly Matched Medium from Modified Maxwells Equations with Stretched Coordinates *Microwave and Optical Technology Letters* 7 599-604.

Ward A J and Pendry J B 1996 Refraction and geometry in Maxwell's equations *Journal of Modern Optics* 43 773-93.

Ward A J and Pendry J B 1998 Calculating photonic Green's functions using a nonorthogonal finite-difference time-domain method *Physical Review B* 58 7252.

Leonhardt U and Philbin T G 2006 General relativity in electrical engineering *New Journal of Physics* 8 247.

Kildishev A V and Narimanov E E 2007 Impedance-matched hyperlens *Opt. Lett.* 32 3432-4.

Kildishev A V and Shalaev V M 2008 Engineering space for light via transformation optics *Optics Letters* 33 43-5.

Chen H Y, Liang Z X, Yao P J, Jiang X Y, Ma H R and Chan C T 2007 Extending the bandwith of electromagnetic cloaks *Physical Review B* 76 241104.

Ramakrishna S A and Pendry J B 2003 Removal of absorption and increase in resolution in a near-field lens via optical gain *Physical Review B* 67.

Garcia de Abajo F J, Gomez-Santos G, Blanco L A, Borisov A G and Shabanov S V 2006 Tunneling mechanism of light transmission through metallic films *Physical Review Letters* 95.

Noginov M A, Zhu G, Bahoura M, Adegoke J, Small C E, Ritzo B A, Drachev V P and Shalaev V M 2006 Enhancement of surface plasmons in an Ag aggregate by optical gain in a dielectric medium *Optics Letters* 31 3022-4.

Klar T A, Kildishev A V, Drachev V O and Shalaev V M 2006 Negative-index metamaterials: Going optical *IEEE Journal of Selected Topics in Quantum Electronics* 12 1106-15.

Zhaowei L., et al., "Far-Field Optical Hyperlens Magnifying Sub-Diffraction-Limited Objects," Mar. 23, 2007 vol. 315 Science www.sciencemag.org.

Jacob, Z., et al., "Semiclassical theory of the hyperlens," J. Opt. Soc. Am A/vol. 24, No. 10/Oct. 2007, © 2007 Optical Society of America.

Xiong, Y., et al., "Two-Dimensional Imaging by Far-Field Superlens at Visible Wavelengths," Nano Letters, 2007, vol. 7, No. 11, 3360-3365, © 2007 American Chemical Society.

Zhang, X., et al., "Superlenses to overcome the diffraction limit," nature materials/ vol. 7/Jun. 2008/ www.nature.com/naturematerials, © 2008 Nature Publishing Group.

Schurig, D., et al., "Transformation-designed optical elements," © 2007 OSA, Oct. 29, 2007,/ vol. 15, No. 22/ Optics Express.

Avrutsky, I., "Guided modes in a uniaxial multilayer," J. Opt. Soc. Am A/vol. 20, No. 3/Mar. 2003, © 2003 Optical Society of America.

Elser, J., et al., "Nonlocal effects in effective-medium response of nanolayered materials," Applied Physics Letters 90, 191109 (2007), © 2007 American Institute of Physics.

Gan, L., et al., "Ray trace visualization of negative refraction of light in two-dimensional air-bridged silicon photonic crystal slabs at 1.55 um," Jun. 8, 2009/ vol. 17, No. 12/ Optics Express.

Jacob, Z., et al., Optical "Hyperlens": imaging in the far field beyond the diffraction limit, © 2006 Optical Society of America.

Kildishev, A., et al., "Materializing a binary hyperlens design," Applied Physics Letters 94, (2009).

Lee, H., et al., "Development of optical hyperlens for imaging below the diffraction limit," Nov. 26, 2007/ vol. 15, No. 24/ Optics Express.

Zhang, J. J., et al., "Directive Emission Obtained by Coordinate Transformation," Progress in Electromagnetics Research, PIER 81, 437-446, 2008.

Litchinitser, N. M., et al., "Negative refraction," Reprinted from the McGraw-Hill Yearbook of Science & Technology 2008. Copyright © 2007 by the McGraw-Hill Companies, Inc.

Litchinitser, N. M., et al., "Photonic Metamaterials," Laser Physics Letter, www.lphys.org, Laser Phys. Lett. 5, No. 6, 411-420 (2008).

Science Daily, "Invisibility Cloak and Ultra-powerful Microscopes: New Research Field Promises Radical Advances in Optical Technologies," Oct. 17, 2008, http://www.sciencedaily.com/releases/2008/10/081016141450.htm, adapted from materials provided by Purdue University.

Belov, P. A., et al., "Subwavelength imaging at optical frequencies using a transmission device formed by a periodic layered metal-dielectric structure operating in the canalization regime," Physical Review B 73, (2006), © 2006 The American Physical Society.

* cited by examiner

PLANAR LENS

This application claims the benefit of U.S. provisional application Ser. 61/107,742 filed on Oct. 23, 2008, which is incorporated herein by reference.

STATEMENT REGARDING FEDERALLY SPONSORED RESEARCH OR DEVELOPMENT

This invention was made with Government support under Army Research Office—Multidisciplinary University Research Initiative Award No. 50342-PH-MUR. The Government may have certain rights in this invention.

TECHNICAL FIELD

The present application relates an apparatus and method for using metamaterials in structures engineered to guide electromagnetic waves.

BACKGROUND

The resolution of a traditional lens is limited to object dimensions of the order of the wavelength due to the decay of evanescent waves in the radiation electromagnetic far field that carry high-spatial-frequency information. A hyperlens permits sub-diffraction-limited imaging in the electromagnetic far field. Such a device magnifies sub-wavelength objects by transforming the evanescent (near-field) waves into propagating waves in an anisotropic medium and then projects the high-resolution image into the electromagnetic far field.

SUMMARY

An apparatus for controlling the flow of electromagnetic waves is described. The structure may be fabricated from a metamaterial, having a spatial variation of electromagnetic properties. The structure may have a first surface as an input surface and a second surface as an output surface, each surface being disposed on a different face of the structure. The permittivity of the metamaterial is anisotropic in two directions of an orthogonal coordinate system, such that the local wave equation has a hyperbolic form. The metamaterial properties may be spatially varying such that energy is guided from an input surface to an output surface, where the energy paths correspond to contours of the orthogonal coordinate system. The structure may be used as, for example, a hyperlens or a light concentrator, where the light is focused into a volume having a dimension less than or equal to a half-wavelength at the design wavelength. The hyperlens is a magnifying lens where features smaller than half a wavelength may be resolved. A method of fabricating a electromagnetic wave control structure for operating at a wavelength is disclosed, including the forming a mold on a surface, depositing layers of a substantially electromagnetically transparent material and a negative permittivity material onto the mold to a thickness such that an upper layer is substantially planar, applying a polymer support layer to the upper layer, and removing the mold.

In another aspect, a method of fabricating an electromagnetic-wave-control structure for operating at a wavelength is disclosed, including defining an etch mask for a first component material of a metamaterial; etching the first component material; and, filling the regions removed by etching with a second component material. One of the first or the second components is substantially electromagnetically transparent and at least one component of the permittivity tensor of the other material is negative, and the permittivity tensor varies in value with position within the structure.

In still another aspect, a method of designing a light guiding structure includes the steps of: selecting a wavelength of operation; identifying a first surface of the structure as an input surface for electromagnetic energy; identifying a second surface of the structure as an output surface for electromagnetic energy. An orthogonal coordinate system is selected such that a first surface of the coordinate system surfaces substantially coincides with the first surface of the structure. The spatial variation of a metamaterial of the structure is computed such that electromagnetic energy is guided from the first surface to the second surface approximately along iso-surfaces of the selected coordinate system. The permittivity of at least two of the tensor components are of different signs.

In yet another aspect, a computer program product, stored on a machine readable media, includes instructions for configuring a computer to perform the steps of: accepting a selected wavelength value; accepting a configuration data defining a structure having at least an input surface and an output surface; selecting a orthogonal coordinate system such that a first surface of the coordinate system surfaces substantially coincides with the first surface; and computing a spatial variation of a metamaterial of the structure such that electromagnetic energy is guided from the first surface to the second surface. The permittivity of at least two of the tensor components are of different signs.

DESCRIPTION

Figure 1:
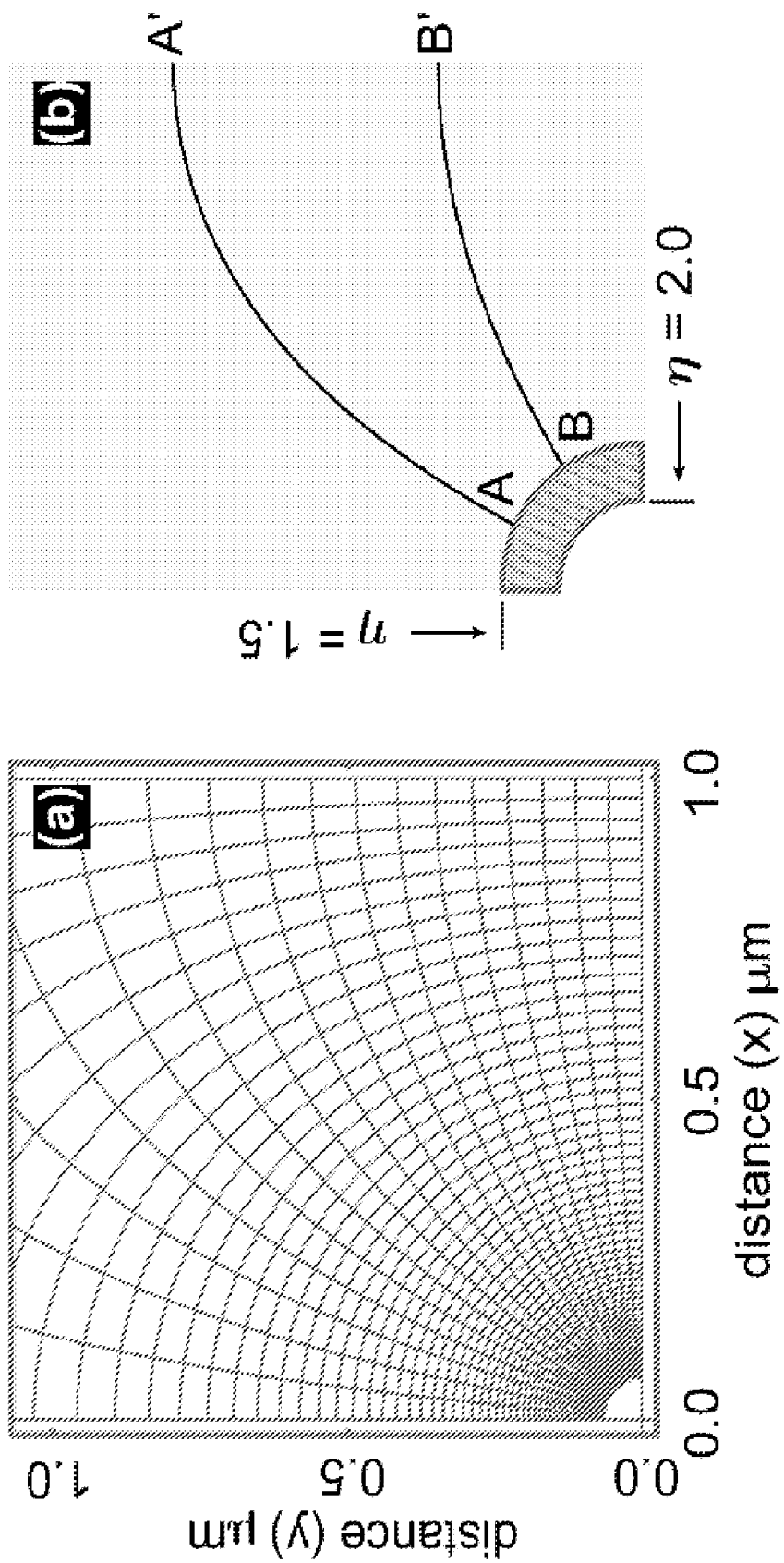
FIG. 1 shows a transformation of concentric cylindrical domains: (a) one-quarter xy-map generated by equation (4) with $x_0=1$ μm, $0 \leq \phi \leq \pi/2$, and $0 \leq \eta \leq 3$; and, (b) mapping of virtual domain (hatched quarter-ring) onto the physical domain (solid shaded region), where the shared boundary is at $\rho=\eta=2$; points A and B from the curvilinear boundary at $\eta=1.5$ are mapped onto the points A' and B' of the external boundary of the lens at $\rho=0$.

Exemplary embodiments may be better understood with reference to the drawings, but these examples are not intended to be of a limiting nature. Like numbered or labeled elements in the same or different drawings perform equivalent functions. When a specific feature, structure, or characteristic is described in connection with an example, it will be understood that one skilled in the art may effect such feature, structure, or characteristic in connection with other examples, whether or not explicitly stated herein.

It will of course be appreciated that in the development of any such actual implementation, numerous implementation-specific decisions must be made to achieve specific development goals, such as compliance with system and business related constraints, and that these goals will vary from one implementation to another. Moreover, it will be appreciated that such a development effort might be complex and time-consuming, but would nevertheless be a routine undertaking of engineering for those of ordinary skill in the art having the benefit of this disclosure.

Where specific wavelengths are described, or the term "optical" is used herein, it will be understood that the terms are being used for convenience in this written description, and not to limit the wavelength of operation of the apparatus or the methods to wavelengths corresponding to those of visible light, infrared light, or ultraviolet light. Lenses, concentrators, or other structures for controlling the propagation of electromagnetic waves, are equally possible at microwave or other wavelengths, being designed in accordance with Maxwell's equations and the methods disclosed herein. The terms "wavelength" and "frequency" are used in the sense of being inversely proportional to each other.

A "metamaterial" (MM) would be understood by a person of skill in the art to be a composite of two or more physical materials where at least one dimension of the one of the materials in the composite material is small compared with the wavelength at which the material is intended to be effective. "Effective" means that the electromagnetic properties of the composite material are in accordance with the design for the use intended. Different component materials may be selected for use at specific wavelength regimes, so as to use the wavelength-dependent properties of the component materials in the design and fabrication of the metamaterials.

The designs and apparatus herein use a design method known as "transformational optics" (TO). Aspects of the method have been described in U.S. Ser. No. 12/573,610, filed on Oct. 5, 2009 and U.S. Ser. No. 11/983,228, filed on Nov. 7, 2007, which are commonly assigned, and are incorporated herein by reference. Further aspects of the TO concept and method of design are disclosed herein.

TO theory, is based on fundamental variation principles (such as the Fermat's principle) and allows the control of the propagation of electromagnetic waves by providing a general approach specifying complex spatial distributions of anisotropic permittivity and permeability. The principle may be expressed as describing the propagation of an electromagnetic wave as being over a path where the integral of the refractive index over a physical path is minimized. Using spatially varying distributions of the electromagnetic parameters of a medium, a "curvilinear" optical space may be created, resulting in a desired directional flow of electromagnetic energy. Generally, the characteristics of the permittivity and permeability may be expressed as a spatially varying tensor quantity. In practice, the required spatial characteristics are approximated by a manufactured, structured, MM. At optical wavelengths, the structure may be comprised, at least in part, of a composite nano-material.

The MM properties are obtained by composite materials of a sub-wavelength-scale using dispersive and non-dispersive materials. Such sub-wavelength components may be distributed within a matrix material. Additional physical phenomena at the interfaces and within the dispersive elements, i.e. size-effects and the effect of surface and structural disorders in highly-anisotropic materials, may need to be incorporated into the computational models for the design of MMs. Tunable and loss-compensated MMs may be used. Loss compensation may be achieved using embedded gain media such as semiconductors, as are found in lasers. Other materials that are known or are being developed to serve as gain media include beads embedded in a polymer matrix (dye laser). The energy to power the gain media may be supplied, for example, electrically, or optically using a pumping wavelength.

Since, in a curvilinear coordinate system, the diagonalized tensor at any location is aligned with the coordinate system axes, the shape of the coordinate system iso-surfaces, as visualized in Cartesian space, is indicative of the type of spatial structure that may be suitable for fabricating a MM with appropriate local spatial variation of material electromagnetic properties. Similarly, when the transformation between an input surface and an output surface of a structure is based on a single coordinate system transformation, such as shown in FIG. 1, the variation of material properties within the structure would be smooth, and this may facilitate design and construction. In particular, when a ray-tracing approximation is used, the correspondence between a full-wave solution and the simple ray-tracing estimation would be improved.

The shape of the physical structure of the MM to realize a hyperlens, a concentrator, or other guiding structure may bear a relationship to the coordinate system, as may be seen by comparing the structure of FIGS. 6a and c with the coordinate system of FIG. 1a.

The design methods may be provided, at least in part, as a computer program product that may include a machine-readable medium having stored thereon instructions which may be used to cause a computer (or other electronic devices) to perform the methods. For the purposes of this specification, the terms "machine-readable medium" shall be taken to include any medium that is capable of storing or encoding a sequence of instructions or data for execution by a computing machine or special-purpose hardware and that may cause the machine or special purpose hardware to perform any one of the methodologies or functions of the present invention. The term "machine-readable medium" shall accordingly be taken include, but not be limited to, solid-state memories, optical and magnetic disks, magnetic memories, optical memories, and the like. The description of a method as being performed by a computer should not preclude the same method being performed, in the whole or in part, by a person.

For example, but not by way of limitation, a machine readable medium may include read-only memory (ROM); random access memory (RAM) of all types (e.g., S-RAM, D-RAM. P-RAM); programmable read only memory (PROM); electronically alterable read only memory (EPROM); magnetic random access memory; magnetic disk storage media; flash memory; or an electrical, optical, or acoustical data storage medium, or the like.

The examples shown herein have used analytic profiles for the MM material properties so as to illustrate certain of the principles which may influence design of the hyperlens or concentrator structures. However, since electromagnetic simulations using finite-element methods or ray tracing, for example, are commonly used in design of complex shapes, and have been shown to yield plausible results, the use of such simulations are envisaged as useful in apparatus design. Ray tracing programs may be effectively used in situations where the spatial components of the material properties, and of the geometry, are slowly varying with respect to a wavelength at the operating wavelength. In optics, this is termed an adiabatic approximation. In other circumstances full-wave finite-element calculations may be performed.

A number of commercial software packages that may be used to perform the numerical analysis and design including: COMSOL MULTIPHYSICS, CST MICROWAVE STUDIO, RSoft FULLWAVE. Various ray-tracing programs are available, such as FRED (available from Photon Engineering, Tucson, Ariz.).

Herein, the theoretical basis for devices transforming near-field radiation patterns into magnified (beyond the diffraction limit) far-field images that can be detected with conventional optics is described. The theory is used in a method of design of several types of apparatus where metamaterials are used to realize the desired electromagnetic properties. In addition to varieties of hyperlenses, a light concentrator is described, which may be considered to represent a "reversed" magnifying lens.

In an example, the spatial variation of the MM and associated energy guidance connect a near-field pattern at an interior, almost circular cylinder, boundary with a far-field pattern at an exterior planar boundary. Hyperlenses are pertinent to, applications such as optical cloaking, sub-wavelength sensing, super-resolution imaging, and image magnification.

In classical optics, information about the sub-wavelength features of an object is carried by evanescent waves that decay exponentially with distance. This rapid amplitude decay results in the loss of sub-wavelength details in the far-field image and sets a limit on imaging resolution.

A hyperlens comprises an anisotropic metamaterial with different signs of the permittivity $\in$ in two orthogonal directions, so that the dispersion relationship becomes a hyperbolic function of wavenumber. Because of the hyperbolic dispersion relationship in such a structure, a hyperlens can transform evanescent fields into propagating waves and produce magnified far-field images of sub-wavelength-scale features of structures.

Previous hyperlens designs suffer the effects of strong light reflection at the input and output surfaces, causing reduced light throughput and other artifacts. The original hyperlens concept required cylindrical symmetry. Such symmetry was needed to slowly increase the EM mode wavelength in the medium as the wave spreads away from the center of the device to the point where propagation in air, or other locally homogeneous medium, becomes possible. This resulted in an impedance mismatch at the device boundary and energy loss and other distortion of the transformed image.

Herein a method of the engineering an optical space with local variations in the MM electromagnetic characteristics is described. The process of "slowing down" the high-k (wavenumber) waves so as to convert the near-field waves into far-field waves propagating in, for example, air can be achieved by suitably varying the MM electromagnetic tensor within the structure. The propagating waves may be also launched from the engineered MM space into media with other electromagnetic properties. Such media may be simple dielectrics such as air, water, silica, or the like, or other metamaterials. The examples shown herein use air as the medium surrounding the structure.

The theoretical approach presented uses closed-form solutions so as to better explain the underlying theoretical basis for the method and apparatus. This permits the person of skill in the art to adapt the method and apparatus so as to solve a variety of practical problems in the control of electromagnetic waves. In many circumstances a resultant spatial design of the MM tensor, which may depend on the practicalities of fabrication technology at a particular stage of development, may result in imperfect performance; however, numerical analysis of the resulting spatial transform may permit characterization of the distortions such that further corrections may be applied in the far field using conventional optics or image processing techniques.

The actual performance compromises in the design or fabrication of a hyperlens or a concentrator may be thought of as similar to that of a conventional lens, where artifacts such as reflections, aberration, chromatic distortion and the like are known, and which may be controlled to within acceptable limits by specific design techniques. The history of such conventional lenses has shown that while the underlying physical theory, shapes, and the like have remained essentially unchanged with time, the overall performance of such lenses have continued to improve based on the development of materials, design computation methods, and fabrication techniques.

Using the design approach described herein, the sensitivity of the wave transformation to imperfections or limitations in the MM design may be explored numerically so as to assist in the development of materials and fabrication techniques.

By creating complex spatial distributions of dielectric permittivity $\in(r)$ and magnetic permeability $\mu(r)$, one can "curve" the propagation space in a desired way and control the flow of electromagnetic energy. The dielectric permittivity and magnetic permeability are generally tensor quantities having a spatial variation within the apparatus. The signs of the quantities may be any combination of positive and negative values that may be realized by natural and composite materials. Materials having dissimilar signs for the permittivity and permeability in at least one axis are known as indefinite materials. In general, the materials may be inhomogeneous and anisotropic.

Generally, the transformations between the input boundary and the output boundary are made using orthogonal coordinate systems, at least as an approximation. Such coordinate systems tend to have iso-surfaces that coincide with component material structures, as represented by the local tensor of the permittivity and permeability. A single coordinate transformation between the input and output surfaces may be useful in reducing the structural complexity and internal matching problems.

The computational complexity is reduced if a cylindrical coordinate system is used to gain insight into the method and apparatus. However, any orthogonal coordinate system may be used to develop a suitable basic structure appropriate for the application.

In a general cylindrical coordinate system (CCS), $\rho$, $\phi$, and z, can be arranged by translating a xy-plane map $[x=x(\rho, \phi), y=y(\rho, \phi)]$ perpendicular to itself, and the resulting coordinate system forms families of concentric cylindrical surfaces. Given that $\vec{r} = \hat{x}x + \hat{y}y$, the scaling factors of a given CCS are equal to $s_\rho = |\vec{r}^{(\rho)}|$, $s_\phi = |\vec{r}^{(\phi)}|$, and $s_z = 1$, where $(.)^{(\xi)} = \partial(.)/\partial\xi$. It is convenient to choose a CCS with $s_\rho = s_\phi = s$.

For the TM case, the curl of the magnetic field intensity, $\vec{H}=\hat{z}h$, is $s\nabla h\times\hat{z}=-h^{(\rho)}\hat{\phi}+h^{(\phi)}\hat{\rho}$ or $-i\omega s d_\rho\hat{\rho}-i\omega s d_\phi\hat{\phi}$; so the components of the electric displacement vector, $d_\rho$ and $d_\phi$, are equal to $d_\rho=(-i\omega s)^{-1}h^{(\phi)}$ and $d_\phi=(i\omega s)^{-1}h^{(\rho)}$, respectively. Transition to h is given by $(\epsilon_\phi^{-1}d_\phi)^{(\rho)}-(\epsilon_\rho^{-1}d_\rho)^{(\phi)}=is\omega\epsilon_0\mu_0\mu h$, and the wave equation is defined by:

$$(s^{-1}\epsilon_\phi^{-1}h^{(\rho)})^{(\rho)}+(s^{-1}\epsilon_\rho^{-1}h^{(\phi)})^{(\phi)}+\mu s k_0^2 h=0. \quad (1)$$

In a virtual free-space $(\eta,\phi,z)$, $$(\tilde{s}^{-1}h^{(\eta)})^{(\eta)}+(\tilde{s}^{-1}h^{(\phi)})^{(\phi)}+\tilde{s}k_0^2 h=0. \quad (2)$$

The simplest approach to transforming concentric cylindrical domains uses a scaling transformation, $\rho=\rho(\eta)$, where the parameter $\eta$ of an initial virtual domain is mapped onto a corresponding the parameter $\rho$ in the physical world, keeping the other coordinate $\phi$ of the xy-plane intact. Then, equation (1) can be rearranged in the following manner using $\rho=\rho(\eta)$ and $f^{(\rho)}=\eta^{(\rho)}f^{(\eta)}$:

$$\left[\left(\frac{\eta^{(\rho)}\tilde{s}}{\epsilon_\phi s}\right)\tilde{s}^{-1}h^{(\eta)}\right]^{(\eta)}+\left[\left(\frac{\tilde{s}}{\eta^{(\rho)}s\epsilon_\rho}\right)\tilde{s}^{-1}h^{(\phi)}\right]^{(\phi)}+k_0^2\left(\frac{\mu s}{\eta^{(\rho)}\tilde{s}}\right)\tilde{s}h=0.$$

An exact solution of the above equation, where the field inside the MM matches that that of free-space, exists when the terms in the parentheses of equation (2) are equal to unity. Where the field inside the MM matches the field in the adjacent free space (for the case where the adjacent space is air or a vacuum), there is no reflection at the boundary, and the interface may be said to be impedance matched. In practice, the exact matching of the impedance at the boundaries and the spatial variation of the material properties within the structure may be limited by the fabrication techniques being used in a specific product.

This lack of exact replication of the theoretical design may be manifest as reflections at the boundary or distortions in the transformed fields. The amount of such mismatch that may be tolerated will depend on the application, the losses in the metamaterial itself, and any compensating gain that may be incorporated into the structure. As a consequence, the situation may be described as substantially impedance matched. The theoretical values are a useful starting point for design purposes.

The MM of the lens would then have the following local properties:

$$\epsilon_\phi=\eta^{(\rho)}\tilde{s}/s, \epsilon_\rho=\tilde{s}/(s\eta^{(\rho)}), \mu=\epsilon_\phi. \quad (3)$$

These design principles would apply, for example, to a device using a concentric mapping of cylindrical domains with either a linear or high-order scaling transform, $\rho(\eta)$, while preserving the common orthogonal parameter $\phi$. For example, consider a CCS generated by the following xy-map, $$x=\alpha\left[\frac{\pi}{2}-\tan^{-1}\left(\frac{\sinh\rho}{\cos\phi}\right)\right], \quad (4)$$

$$y=\frac{\alpha}{2}\ln\left(\frac{\cosh\rho+\sin\phi}{\cosh\rho-\sin\phi}\right),$$

with $s=\alpha\sqrt{2}/\xi_\rho$, for $0\leq\rho<\infty$, and $-\pi/2<\phi<\pi/2$; where $\alpha=2x_0/\pi$ and $\xi_\rho=\sqrt{\cosh 2\rho+\cos 2\phi}$.

For the ideal hyperlens, a straightforward linear transform $\rho(\eta)=\tau(\eta-b)$ with $\tau=a(a-b)^{-1}$ gives $\eta=\tau^{-1}\rho+b$, and $\eta^{(\rho)}=\tau^{-1}$. Thus, $$\epsilon_\phi=\kappa/\tau, \epsilon_\rho=\kappa\tau, \mu=\epsilon_\phi, \quad (5)$$

where $\kappa=\xi_\rho/\xi_\eta$, $\xi_\eta=\sqrt{\cosh 2\eta+\cos 2\phi}$.

FIG. 1a depicts a one-quarter of the xy-map generated by equation (4) with $x_0=1$ μm, $0\leq\phi\leq\pi/2$, and $0\leq\rho\leq 3$. FIG. 1b shows the mapping of a virtual domain (the hatched quarter-ring) onto a physical domain (solid shaded region) with the shared boundary at $\rho=\eta=2$. Thus, points A and B from the virtual external boundary at $\eta=1.5$ are mapped onto the points A' and B' of the physical external boundary of the lens at $\rho=0$.

Calculation of the material properties requires the inverse transforms, which in this case are given by $$\rho=\frac{1}{2}\ln\left(\frac{\cosh\hat{y}+\cos\hat{x}}{\cosh\hat{y}-\cos\hat{x}}\right), \phi=\tan^{-1}\left(\frac{\sin\hat{x}}{\sinh\hat{y}}\right), \quad (6)$$

where the scaled coordinates $(\hat{x},\hat{y})$ are defined as $\hat{x}=x/\alpha$ and $\hat{y}=y/\alpha$.

Finally, the anisotropic permittivity, $\vec{\epsilon}$, is equal to:

$$\vec{\epsilon}=\frac{\kappa}{2}\left[(\tau+\tau^{-1})i+\frac{\tau-\tau^{-1}}{\cosh 2\hat{y}-\cos 2\hat{x}}u\right], \quad (7)$$

where i is a 2×2 idem factor; the components of the 2×2 symmetric matrix u are $u_{xy}=u_1$ and $u_{xx}=-u_{yy}=u_0$, with $u_1=\sin h2\hat{y}\sin 2\hat{x}$ and $u_0=1-\cos h2\hat{y}\cos 2\hat{x}$.

The ring region of FIG. 1 may be used to facilitate impedance matching, where the evanescent fields of a source outside the boundary are permitted to decay somewhat into a region of the same dielectric properties as that of the source region. At the output surface, impedance matching may be performed using, for example, a matching medium.

Figure 2:
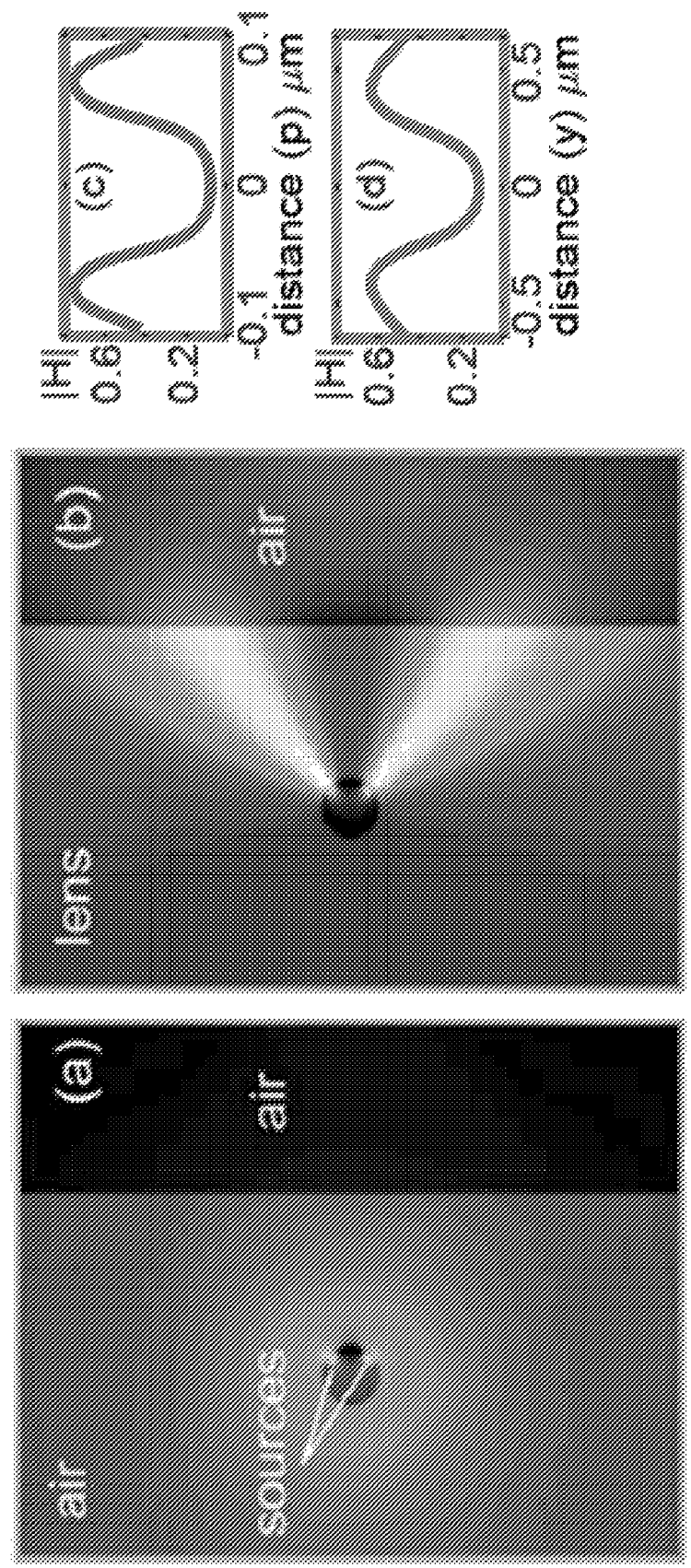
FIG. 2 is a comparison of the magnetic field intensity of a sub-wavelength-dimensioned source (a) generated by two coherent test sources in air (no hyperlens); (b) generated by the two coherent test sources disposed just outside the curvilinear (input) surface of the hyperlens, where the shaded areas indicate the lens cross section in (b); (c) is the H-field magnitude generated by the sources of (a) along the curvilinear (input) surface of the lens, $\rho=\eta=2$; and, (d) is the H-field magnitude at the flat (output) surface $\rho=0$ by the sources of (b)

FIG. 2a compares the free-space far-field performance of two coherent radiating sources with that of the same two sources positioned at an input surface of a hyperlens with smoothly changing local MM properties (FIG. 2b) in accordance with equation (5). The radiating sources in FIG. 2a are two cylindrical segments excited as magnetic line sources at a wavelength $\lambda=1.55$ μm and disposed at the surface of a fictive cylinder disposed perpendicular to the pane of the figure, with a radius of 152 nm; the angular dimensions of the sources range from 10 to 40 degrees. For clarity, although all of the material in FIG. 2a is air, two different regimes are shown. In the left-hand portion, the two sources are disposed at locations on the surface of the fictive cylinder, so as to facilitate comparison with the performance of a hyperlens lens having the same geometry. The right-hand side of FIG. 2a is shown as being darker, for the purposes of defining an image plane which corresponds to the location at which the magnetic field intensity is computed for the hyperlens of FIG. 2b, to be shown in FIG. 2d.

The examples described herein are shown in a cross-sectional view except where specifically indicated, with the cross-section plane being oriented orthogonal to the axis of the cylinder.

FIG. 2b shows the same two magnetic line sources disposed on the surface of a cylinder of the same dimensions and orientation as in FIG. 2a. However, here, the cylinder forms a boundary disposed at the input of a hyperlens fabricated with MM having electromagnetic characteristics in accordance with equation (5). The magnetic line sources are disposed on the boundary of the input cylinder, and a planar outer boundary is formed between the hyperlens and a surrounding region, which is air in this example. The intensity of the electromagnetic energy inside the hyperlens lens is shown, where the lighter shading indicates a greater magnetic field intensity. The magnetic field intensity at the interface between the hyperlens lens and the air is computed, and the result is as shown in FIG. 2d.

The intensity diagram of FIG. 2a is substantially symmetrical about the fictive input surface and decays with distance from the input surface such that the intensity is minimal at the vertical interface positioned at the same distance as the MM-air interface of the hyperlens of FIG. 2b. Hence, at the position of the interface, there is no observable structure of the magnetic intensity. In contrast, in FIG. 2b the intensity within the hyperlens body is seen to be concentrated in two separate regions, corresponding to the radiation patterns of the two magnetic line sources, showing that the energy is being guided from the sources to the planar boundary of the hyperlens.

The field strengths of FIGS. 2c and 2d have a similar amplitude and form, showing that the hyperlens has little apparent distortion when the signal is propagated from the input cylinder to the output interface between the MM and air. A comparison of the distance scales of FIGS. 2c and 2d shows that the image has been magnified by a factor of about 5 when a hyperlens lens is disposed between the sources and the image plane.

The input surface of the hyperlens in FIG. 2b is completely surrounded by the hyperlens structure in the plane perpendicular to the cylindrical axis. For some uses, a more convenient access to the input surface (the inner cylinder in this example) is desired. In order to provide better physical access to the input surface, a part of the lens may be removed.

Figure 3:
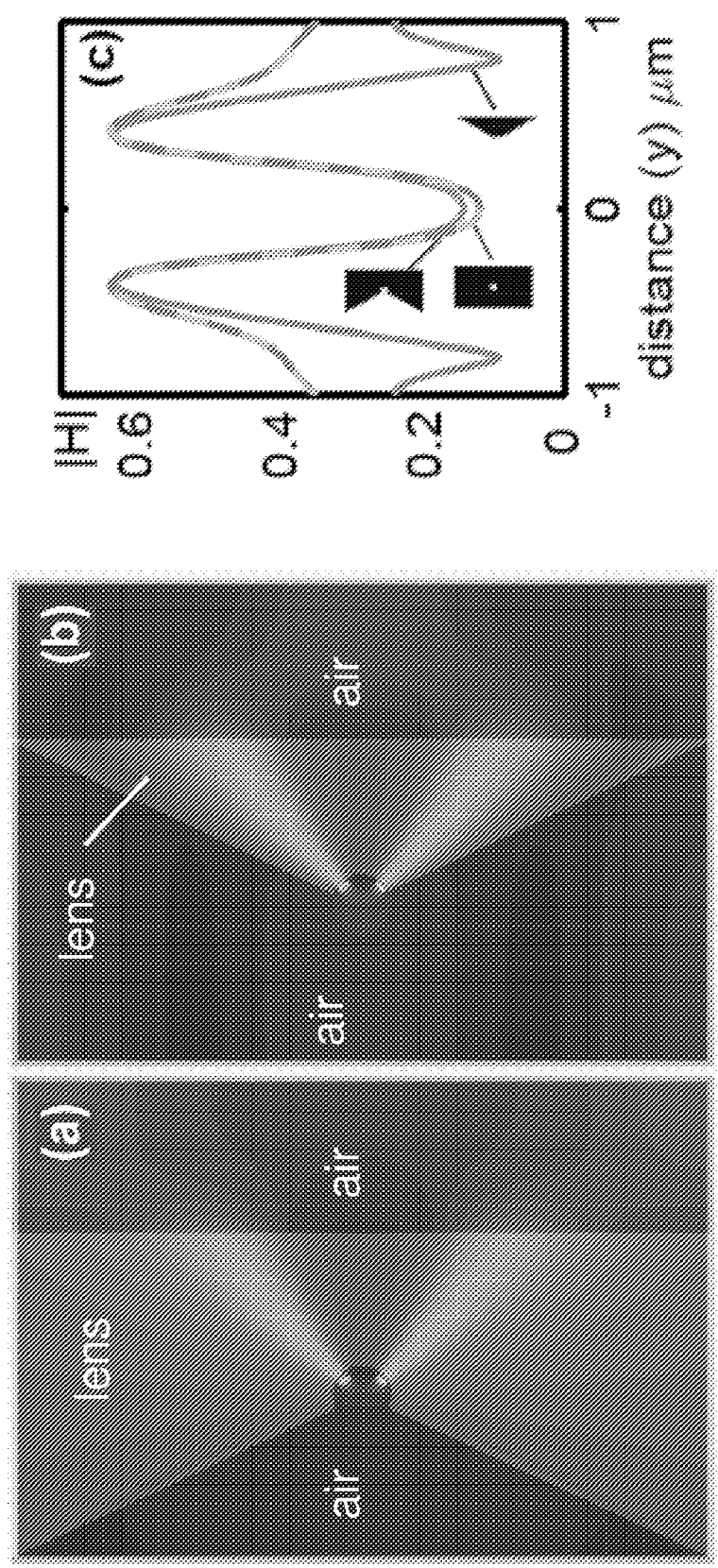
FIG. 3 shows a magnetic field magnetic field map (a) inside a ¾-body lens; (b) inside a ¼-body lens: shaded areas indicate the lens cross-section in (a) and (b); and, (c) magnetic field generated by the sources computed along the flat output surface of the closed and open lens designs.

FIG. 3 shows the effect of two different symmetric truncations of the lens body. In FIGS. 3a and b, the rectangular cross-section of FIG. 2b is modified so that a wedge of MM is removed. The removed wedge is defined by two lines joining adjacent corners of the hyperlens body with the central cylinder. In FIG. 3a, adjacent corners are selected so as not to correspond to the hyperlens output surface. In FIG. 3b, the adjacent corners are selected to correspond to the output surface. In each example, the region comprising the remaining MM is labeled as the "lens".

FIG. 3a depicts the H-field intensity map inside a '¾-body' lens, while FIG. 3b shows the intensity map for a '¼-body' lens. The terms '¾-body' lens and '¼-body' lens are understood to describe situations where a portion of the lens body has been removed. Other geometries may be used for removing portions of the lens. In particular, a '½-body' lens would be understood to be intermediate between the examples shown in FIGS. 3a and b, and be described by a line parallel to the air-lens interface and passing through the cylinder where the sources are disposed.

The H-field magnitudes generated by the sources at the cylinder boundary as measured along the flat (output) boundary of the ¾-body lens and ¼-body lens, are compared with that of the "full" body lens of FIG. 2b in FIG. 3c. The H-field at the image plane (the interface between the MM and the air) of the ¾-body lens (dashed line) and the full-body lens design (grey solid line) effectively overlap. This quality of match is almost preserved in ½-body lens (not shown), but the performance of the lens decreases with further truncation such as in the ¼-body lens. FIG. 3c shows additional structure and a decreased amplitude at the image periphery for the ¼-body lens.

Figure 4:
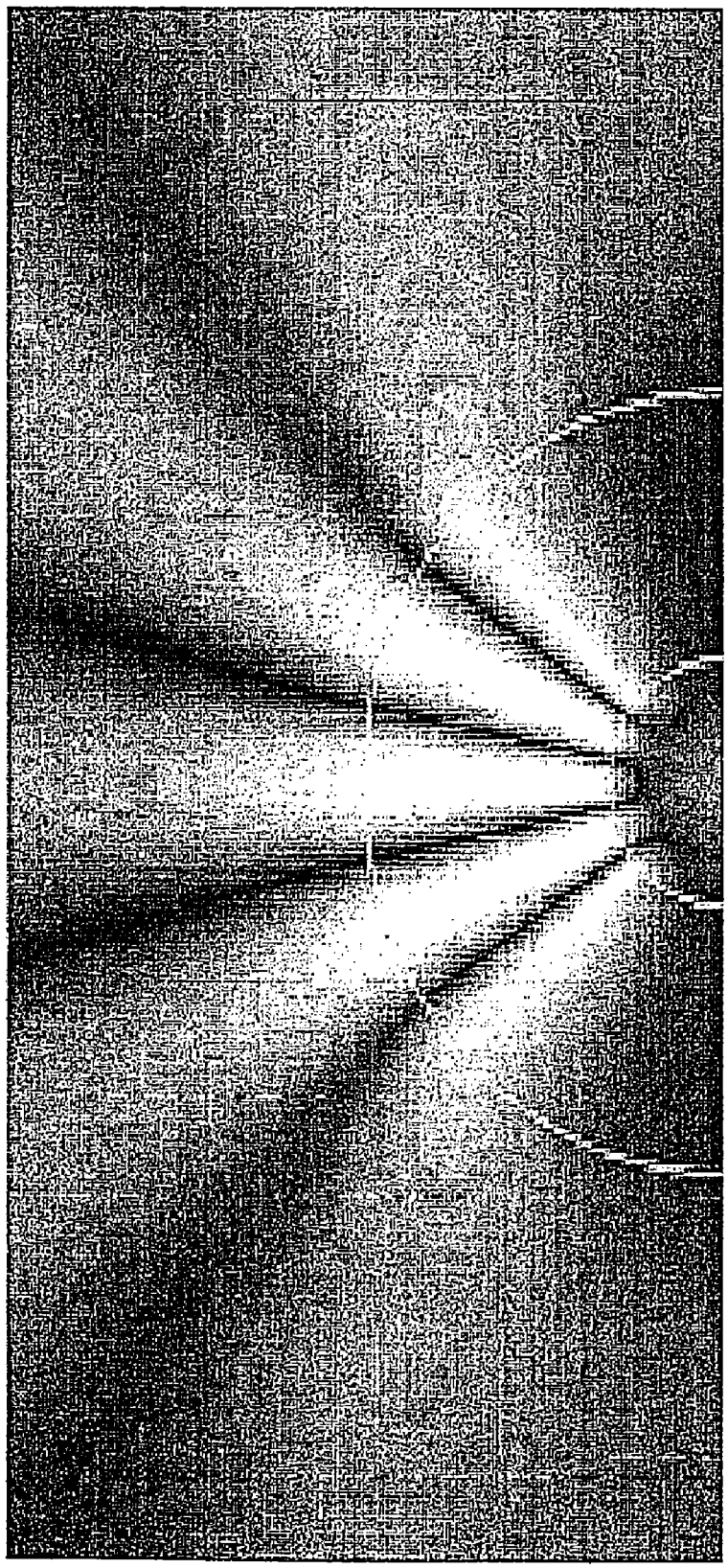
FIG. 4 is a magnetic field map for a hyperlens having five directional magnetic sources positioned at the input surface, where the design provides an impedance match to the exterior environment.

In another example, FIG. 4 shows the magnetic field pattern inside a ½-body lens structure where five sub-wavelength-size cross section magnetic line sources are spaced apart at the input surface and radiate into the lens. The design of this lens is such that the fields are matched at the boundary, as was the case with the previous examples. The emitted energy is seen to be guided in distinct paths from the input surface towards the output surface, rather than decaying to an amorphous radiation field as would be the case with conventional optics for features below the conventional resolution limit.

Other shapes may be used. The examples herein are presented primarily to guide designers in the selection of initial parameters for numerical analysis.

A similar approach may be taken to make a light-concentrating device where, for the ideal case, another common boundary, $\rho=\eta=0$, is used along with the simple transformation $\rho=\tau\eta$, $\tau=1/b$, which results in mapping a virtual boundary $\eta=b$ onto a physical boundary inside the lens ($\rho=\tilde{1}$). The transform gives the same formal properties as (5). This may also be considered to be a consequence of reciprocity. Often, the principles of reciprocity may be used to simplify a computational problem, similar to the approach used to compute a transmitting pattern of an antenna as representing the receiving pattern of the same antenna.

Figure 5:
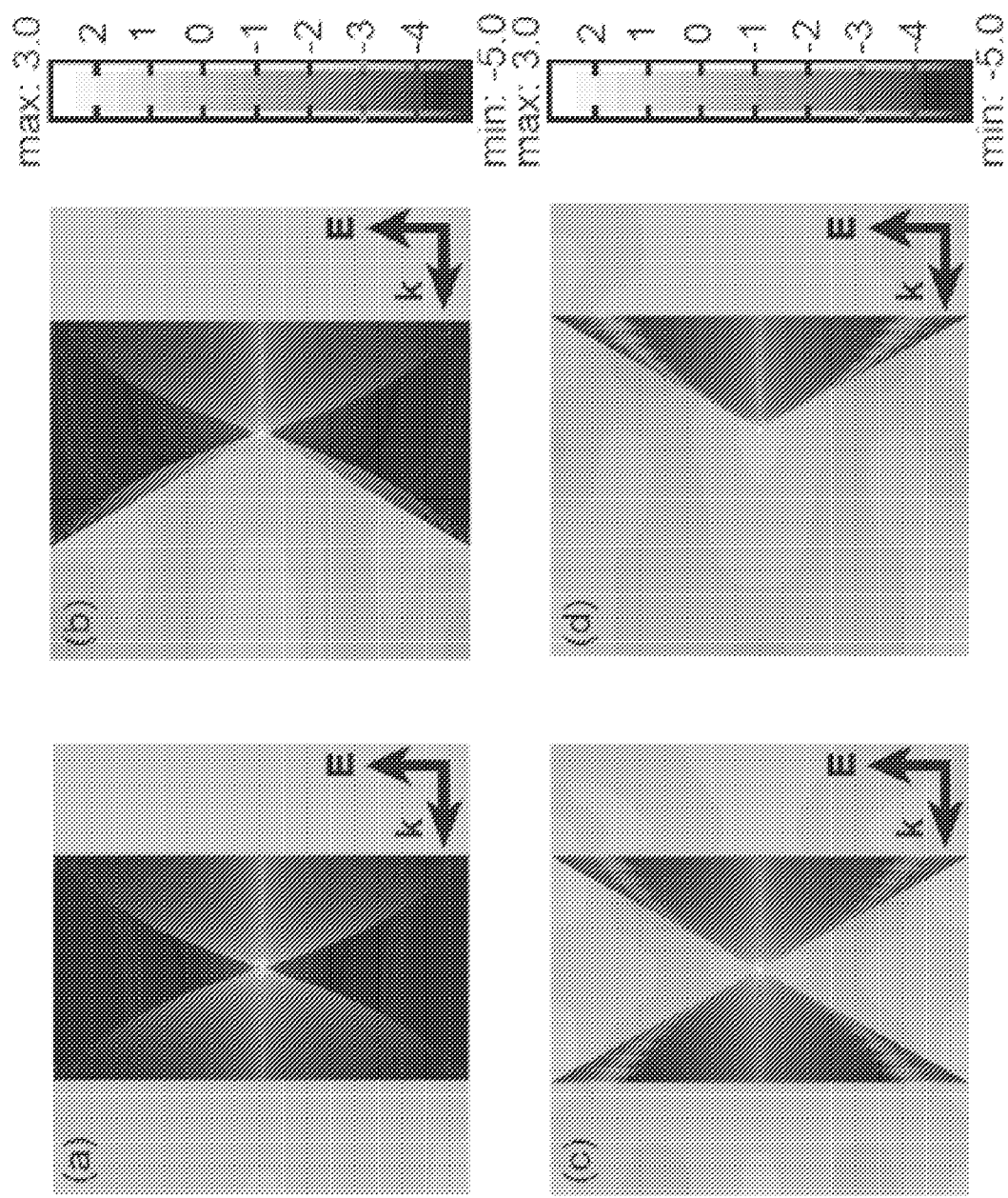
FIG. 5 Comparison of light-concentrators with (a) full-body design; (b) an open ¾-body design; (c) an open ½-body design; and, (d) a ¼-body design: each concentrator is illuminated by a 750 nm TM-polarized plane incident on the right hand face.

FIG. 5 compares the performance of various designs of light-concentrating devices, shown in FIGS. 5b, c, and d with respect to the full-body concentrator shown in FIG. 5a. Each of FIGS. 5 a-d show the time-averaged energy density within the lens using a logarithmic scale, (shown to the right-hand side of the figure), encompassing about 7 orders of magnitude of dynamic range. The external air-dielectric region is shown in light grey so as to define the boundaries of the concentrator. Each concentrator is illuminated by a 750-nm plane wave propagating from right to left. The geometrical and transform parameters of all the devices shown in FIG. 4 are $x_0=1$ µm, $l=200$, and $b=0.01$.

The ¾-body concentrator (FIG. 5 a) and ¼-body concentrator (FIG. 4d) have the same physical geometry as in FIGS. 3a and b, respectively. The ½-body concentrator is formed by removing two wedge shaped pieces defined by lines connecting opposing corners of the lens body. In this instance the ½-body concentrator comprises two opposing-apex ¼-body concentrators. FIGS. 5a and b show that the ¾-body concentrator and the full-body concentrator have essentially identical performance in a region between a vertical line passing through the central cylinder and the right-hand air/MM interface. The intensity of the light in the central cylinder illustrates the intensity enhancement that may be achieved. FIG. 5a also shows that, in a region between the vertical line and the left-hand air interface, the intensity is a mirror image of the other half of the concentrator. That is, after being concentrated in the central cylinder, the energy is again transformed into a propagating wave at the left-hand interface, being a plane wave similar to that which was originally incident at the right-hand interface.

The situation is different in FIG. 5b where, after being concentrated at the cylinder, the light is radiated into the left-hand region as from a point source. A small amount of the light may be seen to be contained in the portion of the lens to the left-hand side of the cylinder, and presumably subsequently radiated, at least in part. This would be observed as a slight distortion of the radiation pattern of the point source.

In the case of FIG. 5c, which may be thought of as two ¼-body structures meeting at the cylinder, since the illumination of the planar input surface was illuminated by a plane wave, the areas of enhanced energy density near the back and side surfaces of the structure are indicative of distortion of the signal and a less effective concentration of light. Structures intermediate in form between the ¼-body and a ½-body forms of construction, similar to those of the lens of FIG. 3 would be expected to show less distortion while still providing access to the cylindrical region. A ½-body concentrator comparable to the ½-body lens, where the concentrator is comprised of the full-body design to the right-hand side of a vertical line passing through the cylinder would be expected to behave similarly to that of the ¾-body concentrator.

Concentrators may be used to illuminate materials placed at the central cylinder with high-intensity electromagnetic energy. Such energy may be converted to electrical signals using semiconductor or other materials, be used in non-linear optical materials, and the like.

In another aspect a material sample, which may be a biological sample or other substance having structural features smaller than the wavelength of the observation may be placed between a structure acting as a concentrator and a structure acting as a magnifying lens. Energy illuminating the sample is enhanced as the energy incident on the flat input surface of the concentrator is focused onto the sample, and the resolution of the observation is enhanced and sub-wavelength features of the sample are observable at the hyperlens planar output surface.

In yet another aspect, a concentrator may permit the "collection" of electromagnetic energy from directions in space and highly localizing that light in nanometer-scale volumes. Both the light concentrator and the hyperlens may have other geometries such as being a spherical structure, for example in an oblate spherical coordinate system, and the structure may be similar to the ½-lens structure previously described.

The manufacturing of small-scale structures is known, for use in semiconductor devices, micro-machined devices and other nanotechnology applications. Here, specific materials and geometries are chosen to achieve the hyperlens or concentrator performance.

One of the possible ways of creating such structures for the MIR employs a deep etch of SiC. For example, structural SiC elements where high aspect ratio (AR>5), deep (>100 μm) trenches may be etched in 6H—SiC. It is likely that deeper etches with high directionality are possible, such as may be used in micro-machined electromechanical structures. One possible fabrication method may use a time-multiplexed etch-passivate (TMEP) process, which alternates etching with polymer passivation of the etch sidewalls. For designing MMs based on binary or multi-component composites, additional passive elements made of mid-infra-red (MIR)-transparent materials may also be used. Since traditional polymers and dielectrics usually exhibit high absorption at MIR wavelengths; low-loss MIR materials (e.g., ZnSe or ZnS) may need to be embedded into the SiC structure.

A technique of fabricating such concentrating structures may use deep silicon etching combined with electroless deposition of metal. The silicon is the dielectric host material and, for example, silver or gold would fill the trenches.

Another possible technique would include patterning an etch mask (for example a layer of $SiO_2$) on Si by EBL (electron beam lithography) and an etch process A deep Si etch may then be used for creating ultra-high AR structures. A deep, highly directional silicon etch may use, for example, high-density, inductively-coupled plasmas (ICP) and fluorine-based non-corrosive chemistry. This technology has been used for etching deep, anisotropic trenches (100 μm deep) with a high aspect ratio (AR) (depth/width ~20-50), high etch rates (5 μm/min) and a high selectivity Si/mask ($SiO_2$) of >500.

In the visible (0.4-0.7 μm) and near-infrared (NIR) wavelength ranges (~1.5 μm), MMs may be based on, for example, anisotropic lamellar metal-dielectric composites with nano-structured plasmonic elements (Ag or Au) combined with dielectric materials (e.g., alumina or silica for the visible, or Si for the NIR). For the MIR wavelength range (~10 μm), MMs may be based on SiC exhibiting a strong phonon-polariton resonance with a high quality factor.

Figure 6:
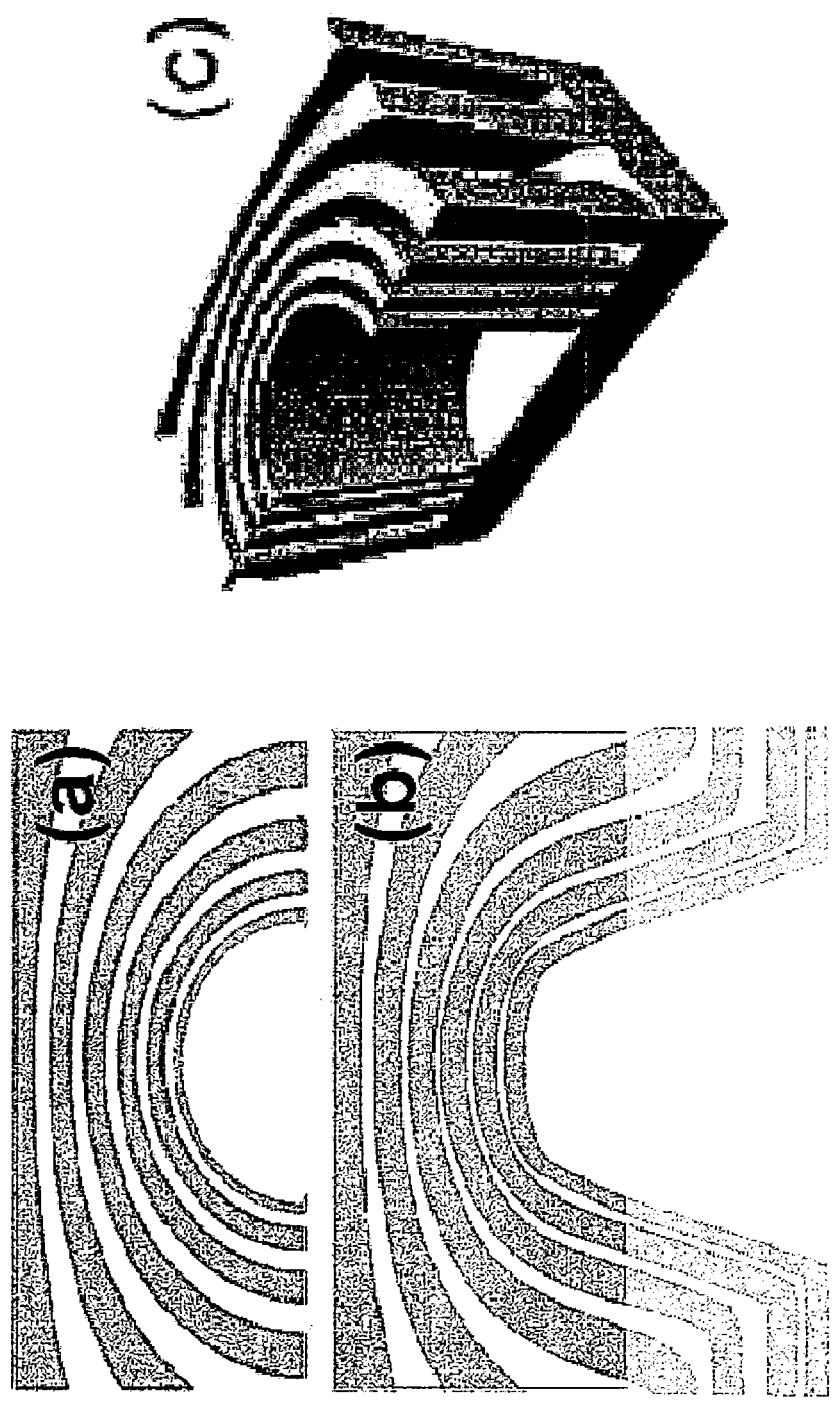
FIG. 6 shows (a) a cross-section of a silicon structure of an ideal infrared concentrator; (b) an approximation to the ideal design which may be fabricated by deposition lamellar materials on a ridge; and, (c) a perspective view of a concept using deep etching to form the silicon structure to be subsequently filled with another material.

A structure suitable for a flat-top hyperlens is shown in FIG. 6. A structure such as shown in cross-section in FIG. 6a has been designed in accordance with the method described herein. FIG. 6c shows a perspective view of such a structure where the fabrication technique would include etching of a bulk material. The etched structure would then be filled with one or more different materials so as to achieve the desired spatial variation of permittivity.

Another fabrication approach may be based on a multi-layer, metal-dielectric, lamellar structure deposited on top of a hill-shaped ridge. The ridge may be prefabricated by lithographic and etching techniques and the ridge may be removed after the lamellar layers have been deposited, yielding the hyperlens multilayer film. FIG. 6b. The resultant spatial properties may not correspond exactly to the theoretical design, since the details would depend on the details of the process steps.

One of the possible ways of achieving a hill-shaped silicon ridge after a standard lithographic patterning step is to make a "tapered wedge" either via wet etch or via a combination of isotropic and anisotropic reactive ion etching and then smoothing the shape by thermal oxidation. The ridge parameters can be changed by fine-tuning the etching and oxidation processes to match the designed values. Multiple layers of metal (Ag) and dielectric (for example, $Al_2O_3$) can then be deposited by e-beam deposition. Fine control over layer parameters like thickness and roughness may be achievable through careful optimization of the deposition process (including pressure in the deposition chamber, deposition rate, and the like, as is known in the art). In order to separate the multi-layered film from the substrate, a layer of polymer may be applied on the top of the multilayer-film and hardened, followed by the silicon substrate removal.

Although only a few exemplary embodiments have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

What is claimed is:

1. An apparatus for controlling the flow of electromagnetic waves, comprising:
   a structure fabricated from a metamaterial, having a spatial variation of electromagnetic properties,
   wherein the structure has a first surface and a second surface disposed on different faces of the structure, and the spatial variation of electromagnetic properties is such that, at least in a portion of the structure, a permittivity of the metamaterial is anisotropic in two directions of an orthogonal coordinate system mapping the input surface to the output surface, and
   an evanescent wave incident at the first surface is radiated as a far-field electromagnetic wave at the second surface.

2. The apparatus of claim 1, wherein that the impedance at least one of the surfaces substantially matches that of a material immediately adjacent to the exterior of the structure, in at least one polarization.

3. The apparatus of claim 1, wherein the metamaterial spatial variation guides a plane wave incident on a flat first surface of the structure to a sub-wavelength focus outside of a second surface of the structure.

4. The apparatus of claim 1, wherein the spatial variation of the metamaterial properties is such that, at least in a portion of the anisotropic portion, the tensor representation of the anisotropic permittivity has different signs in two directions of the coordinate system.

5. The apparatus of claim 1, wherein at least one of the surfaces is a planar surface.

6. The apparatus of claim 1, wherein the metamaterial comprises a multilayer, metal-dielectric, lamellar contoured structure including a valley defining the lamellar contours located on a side opposite a planar surface of the lamellar structure.

7. The apparatus of claim 6, further comprising a polymer support layer contiguous to the planar surface.

8. The apparatus of claim 1, wherein the coordinate system is a cylindrical coordinate system.

9. The apparatus of claim 1, wherein the coordinate system is a spherical coordinate system.

10. The apparatus of claim 1, comprising a first apparatus configured to concentrate a substantially plane-wave light incident on a first surface thereof at a sub-wavelength-focus volume adjacent a second surface thereof, and a second apparatus disposed such that light radiated by an object in the focus volume is directed to a surface of the second apparatus such that light energy is launched from the second apparatus into a far field region as a substantially plane wave.

11. The apparatus of claim 1, wherein the spatial variation of metamaterial properties is determined such that electromagnetic energy incident at one of the first surface or the second surface is controlled so as to flow to a corresponding position of another of the first surface or the second surface.

12. The apparatus of claim 1, where one of the surfaces is a flat surface over a distance corresponding to substantial energy flow between the first and the second surfaces.

13. The apparatus of claim 12, wherein another the surfaces has a substantially cylindrical shape.

14. The apparatus of claim 13, wherein the cylindrical surface is surrounded by the metamaterial.

15. The apparatus of claim 13, wherein the structure is approximately a ½-body shape formed between a plane parallel to the flat surface and bisecting the cylinder, and the flat surface.

16. The apparatus of claim 13, wherein the structure is approximately a ¼-body shape.

17. The apparatus of claim 13, wherein the structure is formed by positioning two ¼-body shapes such that the cylindrical surfaces of the two shapes complete a cylinder.

18. The apparatus of claim 1, wherein an evanescent wave is received from an object placed adjacent to the first surface.

19. The apparatus of claim 18, wherein a source of the evanescent wave has a scale size of a feature in at least one dimension that is smaller than half a wavelength at a design wavelength, and the feature is resolvable at the second surface.

20. The apparatus of claim 1, wherein a far-field plane wave incident at the second surface is guided to the first surface, such that a half-power profile of the intensity immediately adjacent to the exterior of the apparatus near the first surface has a dimension of less than half a wavelength at a design wavelength.

21. The apparatus of claim 14, wherein a plane wave incident on a first first surface is directed through the cylindrical surface disposed within the structure, and re-radiated through a second first surface disposed such that the cylindrical surface is disposed between the first first surface and the second first surface.

22. The apparatus of claim 13, wherein a plane wave incident on a flat surface of a ½-bodly structure is radiated from the region of the cylindrical surface.

23. The apparatus of claim 1, wherein the metamaterial includes a gain medium.

24. The apparatus of claim 23, wherein the gain medium is an optically pumped semiconductor material.

25. The apparatus of claim 23, wherein the gain medium is a dye-doped laser material.

26. The apparatus of claim 23, wherein the energy for the gain medium is supplied electrically.

27. The apparatus of claim 1, wherein an image radiated at the second surface is a magnified representation of an object disposed adjacent to the first surface.

28. The apparatus of claim 27, wherein a feature size of the object is less than half a wavelength at a design wavelength, and the feature is resolvable at the second surface.

* * * * *

UNITED STATES PATENT AND TRADEMARK OFFICE
CERTIFICATE OF CORRECTION

PATENT NO. : 8,094,378 B2  
APPLICATION NO. : 12/605021  
DATED : January 10, 2012  
INVENTOR(S) : Alexander V. Kildishev et al.

Page 1 of 1

It is certified that error appears in the above-identified patent and that said Letters Patent is hereby corrected as shown below:

In the Claims

In column 12, claim 2, lines 60-61, after "wherein that the impedance" replace "at least one" with --at at least one--.

Signed and Sealed this  
Tenth Day of April, 2012

David J. Kappos  
*Director of the United States Patent and Trademark Office*